(12) United States Patent
Putman et al.

(10) Patent No.: US 11,669,078 B2
(45) Date of Patent: *Jun. 6, 2023

(54) PREDICTIVE PROCESS CONTROL FOR A MANUFACTURING PROCESS

(71) Applicant: Nanotronics Imaging, Inc., Cuyahoga Falls, OH (US)

(72) Inventors: Matthew C. Putman, Brooklyn, NY (US); John B. Putman, Celebration, FL (US); Vadim Pinskiy, Wayne, NJ (US); Damas Limoge, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,613

(22) Filed: Jun. 23, 2021

(65) Prior Publication Data
US 2021/0311465 A1    Oct. 7, 2021

Related U.S. Application Data

(63) Continuation of application No. 16/519,102, filed on Jul. 23, 2019, now Pat. No. 11,156,991.
(Continued)

(51) Int. Cl.
*G05B 13/02* (2006.01)
*G05B 19/418* (2006.01)

(52) U.S. Cl.
CPC ..... *G05B 19/41875* (2013.01); *G05B 13/027* (2013.01); *G05B 2219/32193* (2013.01);
(Continued)

(58) Field of Classification Search
CPC ............ G05B 19/41875; G05B 13/027; G05B 2219/32193; G05B 2219/32194; G05B 2219/32195
See application file for complete search history.

(56) References Cited

U.S. PATENT DOCUMENTS 6,266,436 B1    7/2001 Bett et al.
8,185,217 B2    5/2012 Thiele
(Continued)

FOREIGN PATENT DOCUMENTS

AU    2002359881    7/2003
EP    2585248    10/2017
(Continued)

OTHER PUBLICATIONS

Malhotra, et al., "LSTM-based encoder-decoder for multi-sensor anomaly detection," arXiv preprint arXiv:1607.00148 , Jul. 2016.
(Continued)

*Primary Examiner* — Gary Collins
(74) *Attorney, Agent, or Firm* — DLA Piper LLP (US)

(57) ABSTRACT

Aspects of the disclosed technology encompass the use of a deep learning controller for monitoring and improving a manufacturing process. In some aspects, a method of the disclosed technology includes steps for: receiving a plurality of control values from two or more stations, at a deep learning controller, wherein the control values are generated at the two or more stations deployed in a manufacturing process, predicting an expected value for an intermediate or final output of an article of manufacture, based on the control values, and determining if the predicted expected value for the article of manufacture is in-specification. In some aspects, the process can further include steps for generating control inputs if the predicted expected value for the article of manufacture is not in-specification. Systems and computer-readable media are also provided.

20 Claims, 9 Drawing Sheets

Related U.S. Application Data

(60) Provisional application No. 62/865,859, filed on Jun. 24, 2019.

(52) U.S. Cl.
CPC .............. *G05B 2219/32194* (2013.01); *G05B 2219/32195* (2013.01)

(56) References Cited

U.S. PATENT DOCUMENTS

| | | |
|---|---|---|
| 8,612,043 B2 | 12/2013 | Moyne et al. |
| 8,909,926 B2 | 12/2014 | Brandt et al. |
| 9,945,264 B2 | 4/2018 | Wichmann et al. |
| 11,156,992 B2 | 10/2021 | Putman et al. |
| 2003/0061004 A1 | 3/2003 | Discenzo |
| 2006/0058898 A1 | 3/2006 | Emigholz et al. |
| 2015/0184549 A1 | 7/2015 | Pamujula et al. |
| 2015/0185716 A1 | 7/2015 | Wichmann et al. |
| 2017/0093897 A1 | 3/2017 | Cochin et al. |
| 2017/0102694 A1 | 4/2017 | Enver et al. |
| 2018/0114121 A1 | 4/2018 | Rana et al. |
| 2018/0292811 A1 | 10/2018 | Baseman et al. |
| 2018/0292812 A1 | 10/2018 | Baseman et al. |
| 2018/0358271 A1 | 12/2018 | David |
| 2019/0094842 A1 | 3/2019 | Lee et al. |
| 2019/0094843 A1 | 3/2019 | Lee et al. |
| 2019/0197236 A1 | 6/2019 | Niculescu-Mizil et al. |
| 2019/0213099 A1 | 7/2019 | Schmidt et al. |
| 2019/0243346 A1 | 8/2019 | Baseman et al. |
| 2019/0294869 A1 | 9/2019 | Naphada et al. |
| 2019/0295906 A1 | 9/2019 | Clark et al. |
| 2020/0083080 A1* | 3/2020 | Clark .............. H01L 21/67023 |
| 2020/0111689 A1 | 4/2020 | Banna et al. |
| 2020/0314128 A1 | 10/2020 | Hild |

FOREIGN PATENT DOCUMENTS

| | | |
|---|---|---|
| JP | 2008-146621 | 6/2008 |
| JP | 2019-145042 | 8/2019 |
| JP | 2020-114597 | 7/2020 |
| WO | 2018/062398 | 4/2018 |

OTHER PUBLICATIONS

An, et al., "Variational autoencoder based anomaly detection using reconstruction probability," Special Lecture on IE 2.1, Dec. 27, 2015, pp. 1-18.

Liu, et al., "Intelligent tuning method of PID parameters based on iterative learning control for atomic force microscopy," Micron 104, 2018, pp. 26-36.

Sakurada, et al., "Anomaly detection using autoencoders with nonlinear dimensionality reduction," Proceedings of the MLSDA 2014 2nd Workshop on Machine Learning for Sensory Data Analysis, 2014.

Purdue University, "Intrusion alert: System uses machine learning, curiosity-driven 'honeypots' to stop cyber attackers," Research Foundation News, Feb. 6, 2020, https://engineering.purdue.edu/ECE/News/2020/intrusion-alert-system-uses-machine-learning-curiosity-driven-honeypots-to-stop-cyber-attackers.

Karnouskos, "Stuxnet worm impact on industrial cyber-physical system security," IECON 2011—37th Annual Conference of the IEEE Industrial Electronics Society, IEEE, 2011.

Zhou, et al., "Anomaly detection with robust deep autoencoders," Proceedings of the 23rd ACM SIGKDD international conference on knowledge discovery and data mining, 2017.

SPCforExcel, "Interpreting Control Charts", https://www.spcforexcel.com/knowledge/control-charts-basics/interpreting-control-charts, BPI Consulting, LLC, Apr. 2004.

SPCforExcel, "Interpreting Control Charts", https://www.spcforexcel.com/knowledge/control-charts-basics/control-chart-rules-interpretation, BPI Consulting, LLC, Mar. 2016.

American Society for Quality, "What is Statistical Process Control?", https://asq.org/quality-resources/statistical-process-control, 2021.

PCT International Application No. PCT/US20/39064, International Search Report and Written Opinion of the International Searching Authority, dated Jul. 30, 2020, 7 pages.

* cited by examiner

PREDICTIVE PROCESS CONTROL FOR A MANUFACTURING PROCESS

CROSS-REFERENCE TO RELATED APPLICATIONS

This application is a continuation of U.S. application Ser. No. 16/519,102, filed Jul. 23, 2019, which claims the priority to U.S. Application Ser. No. 62/865,859, filed Jun. 24, 2019, which are incorporated by reference in their entireties.

BACKGROUND

1. Technical Field

The present disclosure generally relates to systems, apparatus and methods for predictive process control (PPC) of a manufacturing process. More particularly, the subject technology provides improvements to the manufacturing process and in particular, encompasses systems and methods for adaptively controlling various stations in the manufacturing process, as well as optimizing the final manufacturing product and process, based on predictions made using machine-learning models. As discussed in further detail below, some aspects of the technology encompass systems and methods for training the machine-learning models.

2. Introduction

To manufacture products that consistently meet desired design specifications, safely, timely and with minimum waste, requires constant monitoring and adjustments to the manufacturing process.

SUMMARY OF THE INVENTION

In some aspects, the disclosed technology relates to the use of a deep learning controller for monitoring and improving a manufacturing process. In some embodiments, the disclosed technology encompasses a computer-implemented method that includes steps for receiving a plurality of control values from two or more stations, at a deep learning controller, wherein the control values are generated at the two or more stations deployed in a manufacturing process, predicting, by the deep learning controller, an intermediate or final output of an article of manufacture, based on the control values, determining, by the deep learning controller, if the predicted intermediate or final output specification for the article of manufacture is in-specification, and generating, by the deep learning controller, one or more control inputs if the predicted intermediate or final output for the article of manufacture is not in-specification, wherein the one or more control inputs are configured to cause an intermediate or final output for the article of manufacture to be in-specification.

In another embodiment, the disclosed technology encompasses a system having one or more processors, and a non-transitory memory storing instructions that, when executed by the one or more processors, cause the one or more processors to perform operations including: receiving a plurality of control values from two or more stations, at a deep learning controller, wherein the control values are generated at the two or more stations deployed in a manufacturing process, predicting, by the deep learning controller, an intermediate or final output of an article of manufacture, based on the control values, determining, by the deep learning controller, if the predicted intermediate or final output for the article of manufacture is in-specification, and generating, by the deep learning controller, one or more control inputs if the predicted intermediate or final output for the article of manufacture is not in-specification, wherein the one or more control inputs are configured to cause an intermediate or final output for the article of manufacture to be in-specification.

In yet another embodiment, the disclosed technology encompasses a non-transitory computer-readable storage medium comprising instructions stored therein, which when executed by one or more processors, cause the one or more processors to perform operations including: receiving a plurality of control values from two or more stations, at a deep learning controller, wherein the control values are generated at the two or more stations deployed in a manufacturing process, predicting, by the deep learning controller, an intermediate or final output of an article of manufacture, based on the control values, determining, by the deep learning controller, if the predicted intermediate or final output for the article of manufacture is in-specification, and generating, by the deep learning controller, one or more control inputs if the predicted intermediate or final output for the article of manufacture is not in-specification, wherein the one or more control inputs are configured to cause an intermediate or final output for the article of manufacture to be in-specification.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting in their scope, the principles herein are described and explained with additional specificity and detail through the use of the accompanying drawings in which.

DETAILED DESCRIPTION

Figure 1:
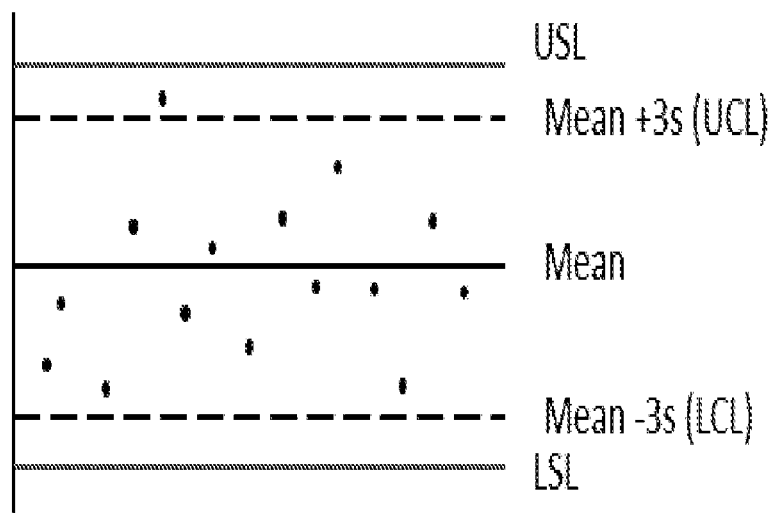
FIG. 1 illustrates an example process for controlling a station using Statistical Process Control (SPC).

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional details relating to the use of image classification in manufacturing control are provided by U.S. Provisional Application No. 62/836,202, entitled "DEPLOYMENT OF AN IMAGE CLASSIFICATION MODEL ON A SINGLE-BOARD COMPUTER FOR MANUFACTURING CONTROL," which is hereby incorporated by reference herein in its entirety.

Additional details relating to the user of computation models for optimizing assembly/manufacturing operations are provided by U.S. Provisional Patent Application No. 62/836,192, entitled "A COMPUTATION MODEL FOR DECISION-MAKING AND ASSEMBLY OPTIMIZATION IN MANUFACTURING," and U.S. patent application Ser. No. 16/289,422, entitled "DYNAMIC TRAINING FOR ASSEMBLY LINES," both of which are hereby incorporated by reference in their entirety.

The manufacturing process is complex and comprises raw materials being processed by different process stations (or "stations") until a final product (referred to herein as "final output") is produced. With the exception of the final process station, each process station receives an input for processing and outputs an intermediate output that is passed along to a subsequent (downstream) process station for additional processing. The final process station receives an input for processing and outputs the final output.

Each process station can include one or more tools/equipment that performs a set of process steps on: received raw materials (this can apply to a first station or any of the subsequent stations in the manufacturing process) and/or the received output from a prior station (this applies to any of the subsequent stations in the manufacturing process). Examples of process stations can include, but are not limited to conveyor belts, injection molding presses, cutting machines, die stamping machines, extruders, CNC mills, grinders, assembly stations, 3D printers, quality control and validation stations. Example process steps can include: transporting outputs from one location to another (as performed by a conveyor belt); feeding material into an extruder, melting the material and injecting the material through a mold cavity where it cools and hardens to the configuration of the cavity (as performed by an injection molding presses); cutting material into a specific shape or length (as performed by a cutting machine); pressing material into a particular shape (as performed by a die stamping machine).

In some manufacturing processes, several process stations can run in parallel. In other words, a single process station can send its intermediate output to one or more stations (e.g., 1 to N stations), and a single process station can receive and combine intermediate outputs from one to n stations. Moreover, a single process station can perform the same process step or different process steps, either sequentially or non-sequentially, on the received raw material or intermediate output during a single iteration of a manufacturing process.

Operation of each process station can be governed by one or more process controllers. In some implementation, each process station has one or more process controllers (referred to herein as "a station controller") that are programmed to control the operation of the process station (the programming algorithms referred to herein as "control algorithms"). However, in some aspects, a single process controller may be configured to control the operations of two or more process stations.

An operator, or control algorithms, can provide the station controller with station controller setpoints (or "setpoints" or "controller setpoints" or CSPs) that represent the desired value/or range of values for each control value. The attributes/parameters associated with a station's tools/equipment/process steps that can be measured during the operation of the station are either control values or station values. If the measured attributes/parameters are also used to control the station, then they are "control values." Otherwise, the measured attributes/parameters are "station values." Examples of control or station values include, but are not limited to: speed, temperature, pressure, vacuum, rotation, current, voltage, power, viscosity, materials/resources used at the station, throughput rate, outage time, noxious fumes, the type of steps and order of the steps performed at the station. Although, the examples are the same, whether a measured attribute/parameter is considered a control value or a station value, will depend on the particular station and whether the measured attribute/parameter is used to control the station or is simply a byproduct of the operation of the station.

The control algorithms can also include instructions for monitoring control values, comparing control values to corresponding setpoints and determining what actions to take when the control value is not equal to (or not within a defined range of) a corresponding station controller setpoint. For example, if the measured present value of the temperature for the station is below the setpoint, then a signal may be sent by the station controller to increase the temperature of the heat source for the station until the present value temperature for the station equals the setpoint. Conventional process controllers used in the manufacturing process to control a station are limited, because they follow static algorithms (e.g., on/off control, PI control, PID control, Lead/Lag control) for adjusting setpoints and prescribing what actions to take when a control value deviates from a setpoint. Conventional process controllers also have limited capability, if any, to analyze non-control values such as ambient conditions (e.g., external temperature, humidity, light exposure, wear and tear of the station), station values, intermediate or final output values, feedback from other process stations, and to make dynamic adjustments to a station controller's setpoints or control algorithms, that control the operation of an associated station.

A process value, as used herein refers to a station value or control value that is aggregated or averaged across an entire series of stations (or a subset of the stations) that are part of the manufacturing process. Process values can include, for example, total throughput time, total resources used, average temperature, average speed.

In addition to station and process values, various characteristics of a process station's product output (i.e., intermediate output or final output) can be measured, for example: temperature, weight, product dimensions, mechanical, chemical, optical and/or electrical properties, number of design defects, the presence or absence of a defect type. The various characteristics that can be measured, will be referred to generally as "intermediate output value" or "final output value." The intermediate/final output value can reflect a single measured characteristic of an intermediate/final output or an overall score based on a specified set of characteristics associated with the intermediate/final output that are measured and weighted according to a predefined formula.

Mechanical properties can include hardness, compression, tack, density and weight. Optical properties can include absorption, reflection, transmission, and refraction. Electrical properties can include electrical resistivity and conductivity. Chemical properties can include enthalpy of formation, toxicity, chemical stability in a given environment, flammability (the ability to burn), preferred oxidation states, pH (acidity/alkalinity), chemical composition, boiling point, vapor point). The disclosed mechanical, optical, chemical and electrical properties are just examples and are not intended to be limiting.

As shown in FIG. 1, the value for the intermediate output of a process station, as well as the value for the final output produced by the manufacturing process, can be evaluated according to Statistical Process Control (SPC). Using statistics, SPC tracks, on a station by station basis: (1) the values of the intermediate outputs or final outputs generated by a station over a period of time; and (2) the mean of the intermediate or final output values and the standard deviation from the mean. For example, FIG. 1 shows intermediate output values for a particular station. Each dot represents an intermediate output produced by the station and its value, and the distance of the dot from the mean (represented by the black line in the middle) shows how much the intermediate output value deviates from the mean for that particular station. An upper and lower control limit (UCL AND LCL) can be defined for the particular station (for example one or more standard deviations above or below the mean). FIG. 1 shows the upper and lower control limits are set at three standard deviations above and below the mean (represented by the dashed lines). The upper and lower control limits are usually narrower than the upper and lower specification limits (USL AND LSL) defined for the intermediate/final output values.

In some aspects, statistical values for intermediate outputs and/or final outputs can be used to make determinations as to when an article of manufacture is "in-specification," i.e., when an output has achieved certain pre-specified design requirements. As such, in-specification can refer to an article of manufacture, or a characteristic of an article of manufacture, that meets or exceeds a specified design requirement or set of requirements. By way of example, an article of manufacture that is deemed to be in-specification may be one that achieves specified statistical requirements, such as having acceptable deviations from an ideal or average (mean) value.

As long as the values for the intermediate/final output are within the upper and lower control limits, then the process station/overall process is considered to be in control and typically, no interventions or corrective actions will be taken. Interventions or corrective action will typically be taken when the value for the intermediate/final output exceeds the upper or lower control limit defined for that measurement. However, SPC control has limited impact on improving or optimizing the manufacturing process, because intervention/correction only occurs when an upper/lower control limit is exceeded. Adjustments are not usually made when the process is in control. Further, SPC evaluates a single station in isolation and does not consider trends across many stations or the impact of several stations together on the final product.

Accordingly, new mechanisms are needed that can consider the inputs to and outputs of each station individually, and together with the other inputs to and outputs of the other stations in the manufacturing process, to intelligently and dynamically adjust inputs to a station controller to better control an associated station's operation. In particular, new mechanisms are needed to predict inputs that will optimize the manufacturing process to produce in specification final outputs. New mechanisms are also needed to predict inputs that will improve upon the design and manufacturing process of the final outputs. In addition, new mechanisms are needed to decrease variability in the manufacturing process and the final output.

Aspects of the disclosed technology address the foregoing limitations of conventional manufacturing processes by providing mechanisms (which can include systems, methods, devices, apparatuses, etc.) for progressively improving the manufacturing process and the resulting product of manufacture without disrupting the ongoing manufacturing process (referred to herein as predictive process control). As such, the disclosed technology can be used to retrofit and integrate with existing manufacturing systems and infrastructure, without causing disruptions to ongoing manufacturing processes. Improvements are realized by providing dynamic control to one or more process stations in the manufacturing process, via conventional station controllers, to: (1) consistently produce final outputs that are within specification; (2) optimize the design and manufacturing process of the final output; and (3) decrease variability in the manufacturing process and the final output.

A deep learning controller based on machine-learning/ artificial intelligence (AI) models may be used to evaluate control/station/process values and intermediate and final output values and determine adjustments to a station controller's input. As understood by those of skill in the art, machine learning based techniques can vary depending on the desired implementation, without departing from the disclosed technology. For example, machine learning techniques can utilize one or more of the following, alone or in combination: hidden Markov models; recurrent neural networks; convolutional neural networks (CNNs); deep learning; Bayesian symbolic methods; reinforcement learning, general adversarial networks (GANs); support vector machines; image registration methods; applicable rule-based system.

Machine learning models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. The machine learning models can be based on supervised and/or unsupervised methods.

Machine learning models, as discussed herein, can also be used to determine the process stations, control/station/process values and intermediate output values that are most influential on the final output value ("key influencers"), and to optimize the manufacturing process by targeting the key influencers.

Figure 2:
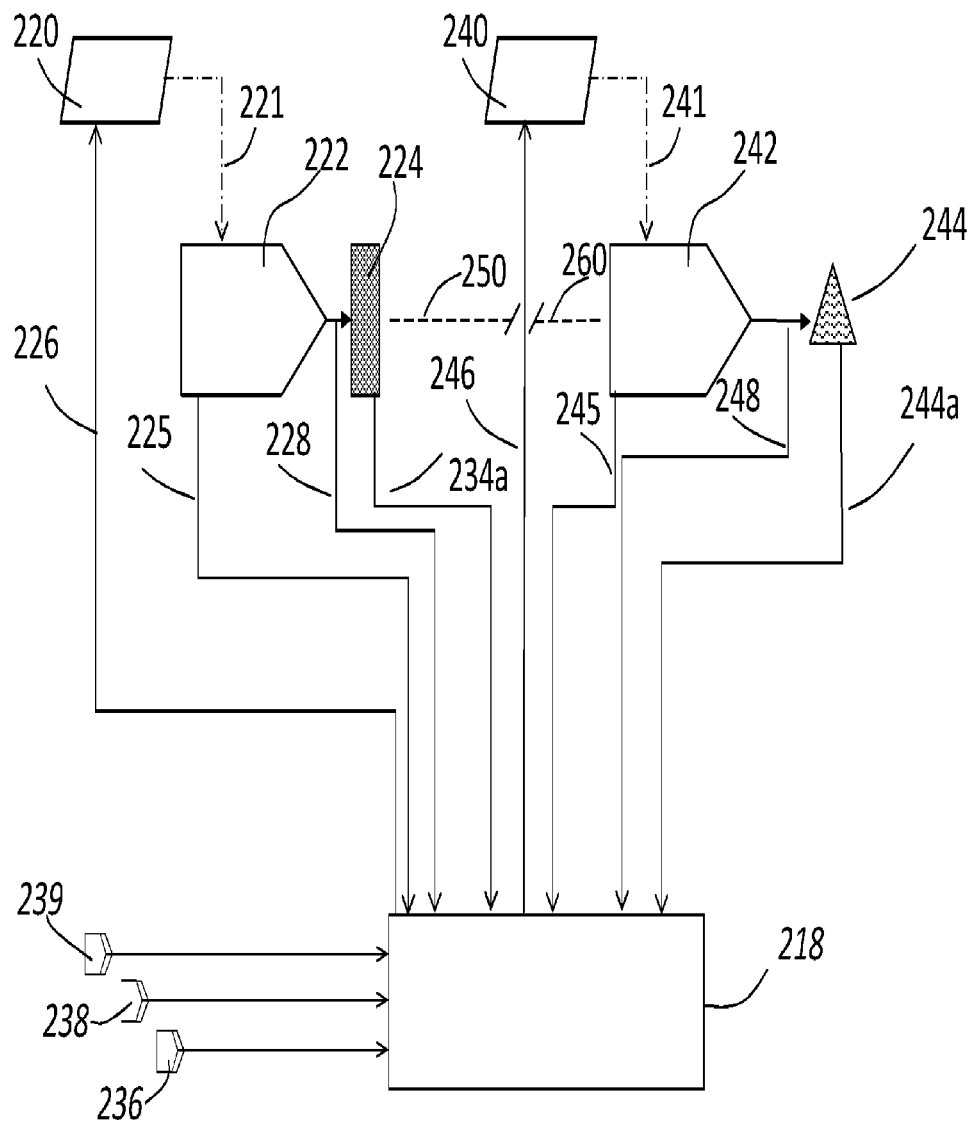
FIG. 2 shows an example embodiment of a deep learning controller configured for predictive process control (PPC).

FIG. 2 illustrates an example deep learning controller 218 that can be configured to control any number of (referred to herein by "n") processing stations in a manufacturing process using predictive process control, as discussed later in connection with FIGS. 4-7. In FIG. 2, the n processing stations of a manufacturing process are represented by process stations 222 and 242. The process stations can operate serially or in parallel. Universal inputs 236, experiential priors 239, functional priors 238, and inputs from each of the n stations (e.g., 222 and 242) can be provided to deep learning controller 218.

Functional priors, as used herein, refers to information relating to the functionality and known limitations of each process station, individually and collectively, in a manufacturing process. The specifications for the tools/equipment used at the process station are all considered functional priors. Example functional priors can include, but are not limited to: a screw driven extruder that has a minimum and maximum speed that the screw can rotate; a temperature control system that has a maximum and minimum temperature achievable based on its heating and cooling capabilities; a pressure vessel that has a maximum pressure that it will contain before it explodes; a combustible liquid that has a maximum temperature that can be reached before combustion. Functional priors can also include an order in which the individual stations that are part of a manufacturing process perform their functions. In some embodiments, several stations can run in parallel and combine their intermediate outputs at a subsequent station.

Experiential priors, as used herein, refers to information gained by prior experience with, for example performing the same or similar manufacturing process; operating the same or similar stations; producing the same or similar intermediate/final outputs. In some embodiments, experiential priors can include acceptable final output values or unacceptable final output values. Acceptable final output values refer to an upper limit, lower limit or range of final output values where the final output is considered "in specification." In other words, acceptable final output values describe the parameters for final output values that meet design specification, i.e., that are in-specification. Conversely, unacceptable final output values refer to upper/lower limits or range of final output values where the final output is "not in specification" (i.e., describe the parameters for final output values that do not meet design specifications). For example, based on prior experience it might be known that an O-ring used to seal pipes, will only seal if it has certain compression characteristics. This information can be used to establish acceptable/unacceptable compression values for an O-ring final output. In other words, all O-ring final outputs that have acceptable compression values are able to perform their sealing functionality, while all O-ring final outputs that have unacceptable compression values cannot perform their sealing functionality. Acceptable intermediate output values, which can be defined per station, refer to upper/lower limits or a range of intermediate output values that define the parameters for an intermediate output that can ultimately result in a final output that is in specification, without requiring corrective action by other stations. Unacceptable intermediate output values, which can also be defined by station, refer to upper/lower limits or range of intermediate output values that define the parameters for an intermediate output that will ultimately result in a final output that is not in specification, unless corrective action is taken at another station. Similarly, acceptable/unacceptable parameters can be defined for other variables relating to the manufacturing process:

| | |
|---|---|
| Acceptable control/station/setpoint values | upper/lower limits or range of values, defined per station for each type of control/station value and setpoint, that define the parameters for, or are an indication of, satisfactory station performance. Satisfactory performance refers to (1) the performance of the station itself (e.g., throughput rate is not too slow, there is no outage, noxious fumes or other harmful condition, resources are being used efficiently); and/or (2) control/station/setpoint values that cause an in specification final output to be achievable, without requiring corrective action by other stations. |
| Unacceptable control/station/setpoint values | upper/lower limits or range of values, defined per station for each type of control/station value and setpoint, that define the parameters for, or are an indication of, unsatisfactory station performance. Unsatisfactory performance refers to (1) the performance of the station itself (e.g., throughput rate is too slow, an outage, noxious fumes or other harmful station condition, resources are not being used efficiently); and/or (2) control/station/setpoint values that cause an in specification final output to be unachievable, unless corrective action by other stations is taken. |
| Acceptable process performance | upper/lower limits or range of values for each type of process value, that define the parameters for, or are an indication of, satisfactory performance of the manufacturing process. Satisfactory performance refers to (1) the functioning of the process itself (e.g., throughput rate is not too slow, there is no outage, noxious fumes or other harmful condition, resources are being used efficiently); and/or (2) process values that cause an in specification final output to be achievable. |
| Unacceptable process performance | upper/lower limits or range of values, defined for each type of process value, that define the parameters for, or are an indication of, unsatisfactory process performance. Unsatisfactory performance refers to (1) the process performance itself (e.g., throughput rate is too slow, there is an outage, noxious fumes or other harmful condition, resources are not being used efficiently); and/or (2) process values that cause an in specification final output to be unachievable. |

Experiential priors can also include acceptable and unacceptable manufacturing performance metrics. Manufacturing performance metrics calculate one or more aspects of multiple iterations of the manufacturing process (e.g., production volume for a specified time period, production downtime for a specified time period, resources used for a specified time period or a specified number of final outputs, percentage of products not in specification for a specified time period, production volume for a particular operator, material costs associated with a specified number of final outputs).

Universal inputs, as used herein, refers to a value that is not specific to a particular process station, but rather to an aspect of the entire manufacturing process, for example, a date, time of day, ambient temperature, humidity or other environmental conditions that might impact the manufacturing process, operator, level of skill of the operator, raw materials used in the process, raw material specifications such as color, viscosity, particle size, among other characteristics that are specific to the raw material, specific lot numbers and cost of raw materials, tenure of the equipment/tools for each station, identifying information such as production work order numbers, batch numbers, lot numbers, finished product numbers and finished product serial numbers.

Note, that the examples provided for each of functional priors, experiential priors and universal inputs represent one way to classify these examples, other suitable classifications can be used. For example, another way to classify the input that is provided to deep learning controller 218 is: pre-process inputs (e.g., experiential priors, functional priors, material properties, scheduling requirements); in-process inputs (e.g., universal inputs, control values, station values, intermediate values, final output values, process values); post-process inputs (e.g., manufacturing performance metrics and other analytics).

Each process station can be controlled by one or more associated station controllers (e.g., station controller 220 controls process station 222 and station controller 240 controls process station 242). In other embodiments a single station controller can control multiple process stations. Deep learning controller 218 can provide control inputs (represented by 226 and 246) based on predictive process control to each process station controller. In response to the received control input (e.g., 226 and 246), each station controller can provide one or more control signals (e.g., 221 and 241) that provides commands for regulating a station's control values (e.g., control values 225 and 245). Each station outputs an intermediate output (e.g., 224 and 244), that has an intermediate output value (234*a* and 244*a* respectively). All intermediate output values and the final output value from the processing stations are provided to deep learning controller 218. Each station also outputs station values (e.g., 228 and 248) to deep learning controller 218. FIG. 2 also shows that intermediate output 224 is sent (step 250) to 1 to n subsequent stations, which can represent a single station or n multiple stations. Station 242, as shown in FIG. 2, can receive (step 260) an intermediate input from 1 to n prior stations.

It is understood that the communication among deep learning controller 218, the station controllers and process stations can use any suitable communication technologies that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies e.g., local area network (LAN), a wide area network (WAN), the Internet, Bluetooth technologies, Nearfield communication technologies, Secure RF technologies, and/or any other suitable communication technologies.

In some embodiments, operator inputs can be communicated to deep learning controller 218, and/or any of the station controllers or process stations using any suitable input device (e.g., keyboard, mouse, joystick, touch, touchscreen, etc.).

In some embodiments, one or more process stations can be operated manually, for example, by a human operator performing specific instructions. Instead of an electronic station controller, an operator follows a set of instructions, which can be provided manually or via electronic means (e.g., via a video or computer display). For example, at a manual station, an operator can perform the functions of cutting wire to a specific length and measuring the length of the cut wire. Manual feedback, such as the length of the cut wire, can be provided to deep learning controller 218. Using predictive process control, as described herein, deep learning controller 218 can determine whether the wire was cut to the desired length specification and provide improvements to the cutting process, for example, that are provided in the form of a set of instructions to the operator of the manual station.

Figure 3:
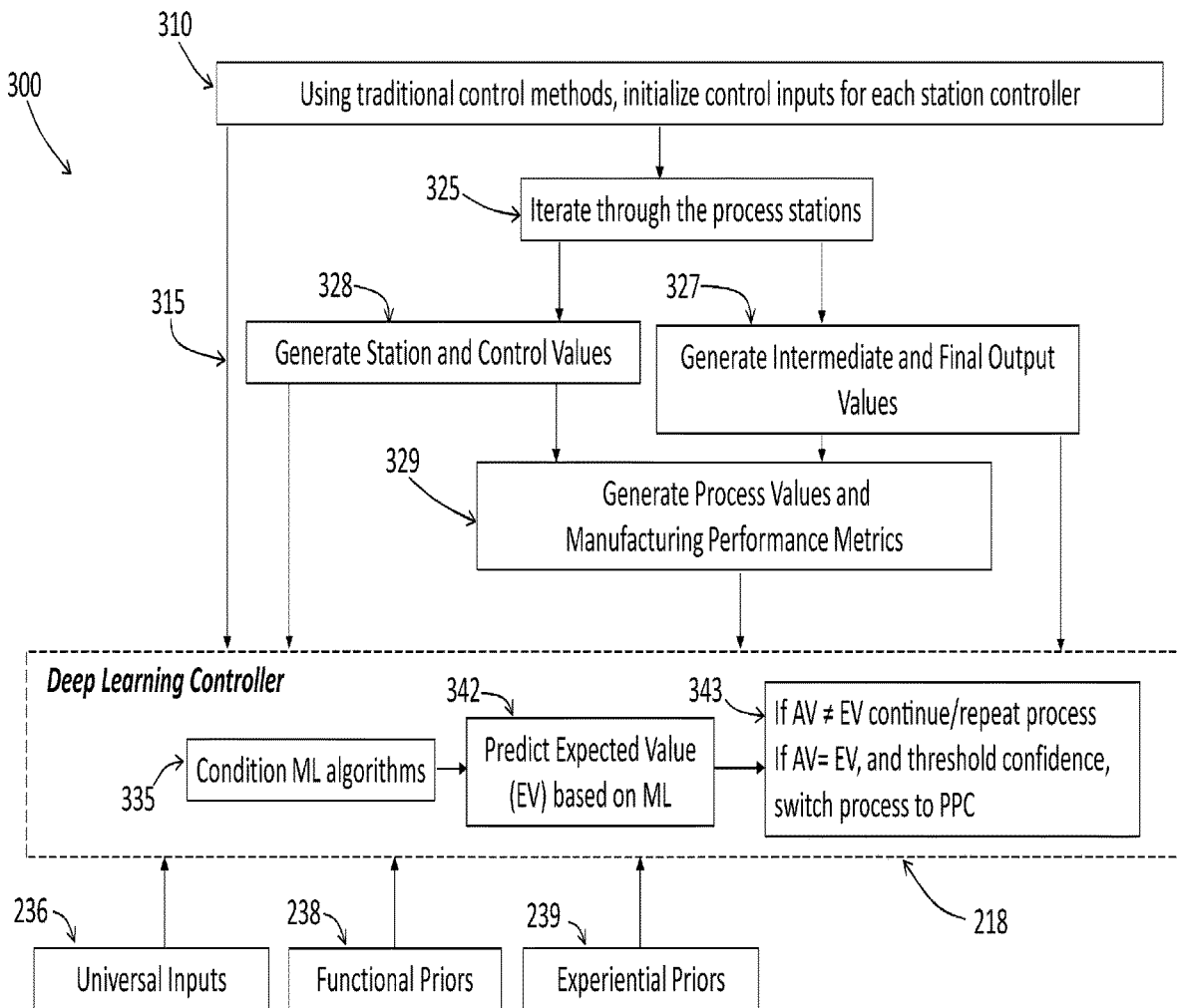
FIG. 3 shows an example method for training a deep learning controller.

FIG. 3 provides a process 300 for conditioning (training) a deep learning controller 218, according to some embodiments of the disclosed subject matter.

In step 310, the setpoints, algorithms and other control inputs for each station controller in a manufacturing process can be initialized using conventional methods. Further, the control algorithms/operator can provide initial control/station values. The control algorithms, initial setpoint values, and initial control/station values can be provided to deep learning controller 218 (step 315).

Note, that control values, control algorithms, setpoints and any other information (e.g., process timing, equipment instructions, alarm alerts, emergency stops) provided to a station controller will be referred to collectively as "station controller inputs" or "control inputs."

In addition, other inputs, like functional priors 238, experiential priors 239 and universal inputs 236 can be provided to deep learning controller 218.

In step 325, the manufacturing process iterates through all the process stations using conventional control methods. As discussed above, the process stations discussed herein can operate in series or in parallel. Further, a single station can perform: a single process step multiple times (sequentially or non-sequentially), or different process steps (sequentially or non-sequentially) for a single iteration of a manufacturing process. The process stations generate intermediate outputs, or a final output if it is a final station. The intermediate output is transmitted to subsequent (downstream) station(s) in the manufacturing process until a final output is generated.

As the process iterates through each station, all the values associated with: an individual station (e.g., control values); an output of an individual station (e.g., station values, intermediate/final output values), or multiple stations (e.g., process values) are measured or calculated and provided to condition the machine learning algorithms of deep learning controller 318 (steps 327 and 328).

In some embodiments manufacturing performance metrics (e.g., production volume for a specified time period, production downtime for a specified time period, resources used for a specified time period or a specified number of final outputs, percentage of products not in specification for a specified time period, production volume for a particular operator, material costs associated with a specified number of final outputs) for the manufacturing process under conventional control can be calculated and provided to deep learning controller 218 (step 329).

Although not shown, any actions taken (or control signals generated) by the station controller in response to a received control value or other control input from a process station can be provided to deep learning controller 218. Such actions can include adjusting temperature, speed, etc. In addition, deviations from: acceptable setpoints, acceptable intermediate/final output values, acceptable control/station/process values can also be calculated and provided to deep learning controller 218.

Note all inputs to deep learning controller 218 can be entered electronically or via manual means by an operator.

The conditioning of the machine learning models of deep learning controller 218 (step 235) can be achieved through unsupervised learning methods. Other than functional priors 238, experiential priors 239, universal inputs 236 that are input into deep learning controller 218, deep learning controller 218 draws inferences simply by analyzing the received data that it collects during the iteration of the manufacturing process (e.g., steps 328 and 329). In other embodiments, deep learning controller 218 can be conditioned via supervised learning methods, or a combination of supervised and unsupervised methods or similar machine learning methods. Further, the training of deep learning controller 218 can be augmented by: providing deep learning controller 218 with simulated data or data from a similar manufacturing process. In one embodiment, deep learning controller 218 can be conditioned by implementing deep learning controller 218 into a similar manufacturing process and fine-tuning the deep learning controller during implementation in the target manufacturing process. That is, training of deep learning controller 218 can be performed using a training process that is performed before deep learning controller 218 is deployed into a target manufacturing environment.

Based on the conditioning of the machine learning models, deep learning controller 218 can predict the values for the characteristics of the final output ("expected value" or "EV") that determine whether or not the final output value will be acceptable or not (i.e., whether or not the final output is "in specification") (step 342). Deep learning controller 218 can provide a confidence level for its prediction at an instant or over a specific time period, for example, to provide a measure of statistical confidence in the prediction. In some aspects, the confidence level may be expressed as a numerical probability of accuracy for the prediction, in other aspects, the confidence level may be expressed as an interval or probability range. At step 343, deep learning controller 218 can compare the expected value to the actual measurements of the specified characteristics of the final output ("actual value" or "AV").

In some aspects, deep learning controller 218 can be configured to perform EV predictions regarding output characteristics on a station-by-station basis. That is, deep learning controller 218 can make EV predictions regarding outputs at a specific station, and subsequently compare those predictions to actual outputs observed at that station. Alternatively, EV predictions can be made for outputs resulting from combined processing performed by two or more stations, depending on the desired implementation.

As the manufacturing process proceeds through each station, and deep learning controller 218 receives additional information, deep learning controller 218 can revise its expected value, along with the confidence level. If deep learning controller 218's predictions are correct, over a specified time period and with a predefined threshold confidence level, then deep learning controller 218 can provide a signal that deep learning controller 218 is ready to control the operation of the process stations.

In some embodiments, deep learning controller 218 can also, after initialization of the station controllers, at the outset of an iteration of the manufacturing process (i.e., proceeding through all stations in the manufacturing process), as well as over the course of the manufacturing process, predict whether any control inputs will cause unsatisfactory station performance or impact process performance (i.e., cause unacceptable process performance). Deep learning controller 218 can provide a confidence level for its predictions. Deep learning controller 218 can determine whether or not deep learning controller 218's predictions were correct. In further embodiments, if deep learning controller 218's predictions, both with respect to the expected final output value and predicted station/process performance, over a specified time period and with a threshold confidence level, as defined by an operator, then deep learning controller 218 can provide a signal that deep learning controller 218 is ready to control the operation of the process stations.

Figure 4:
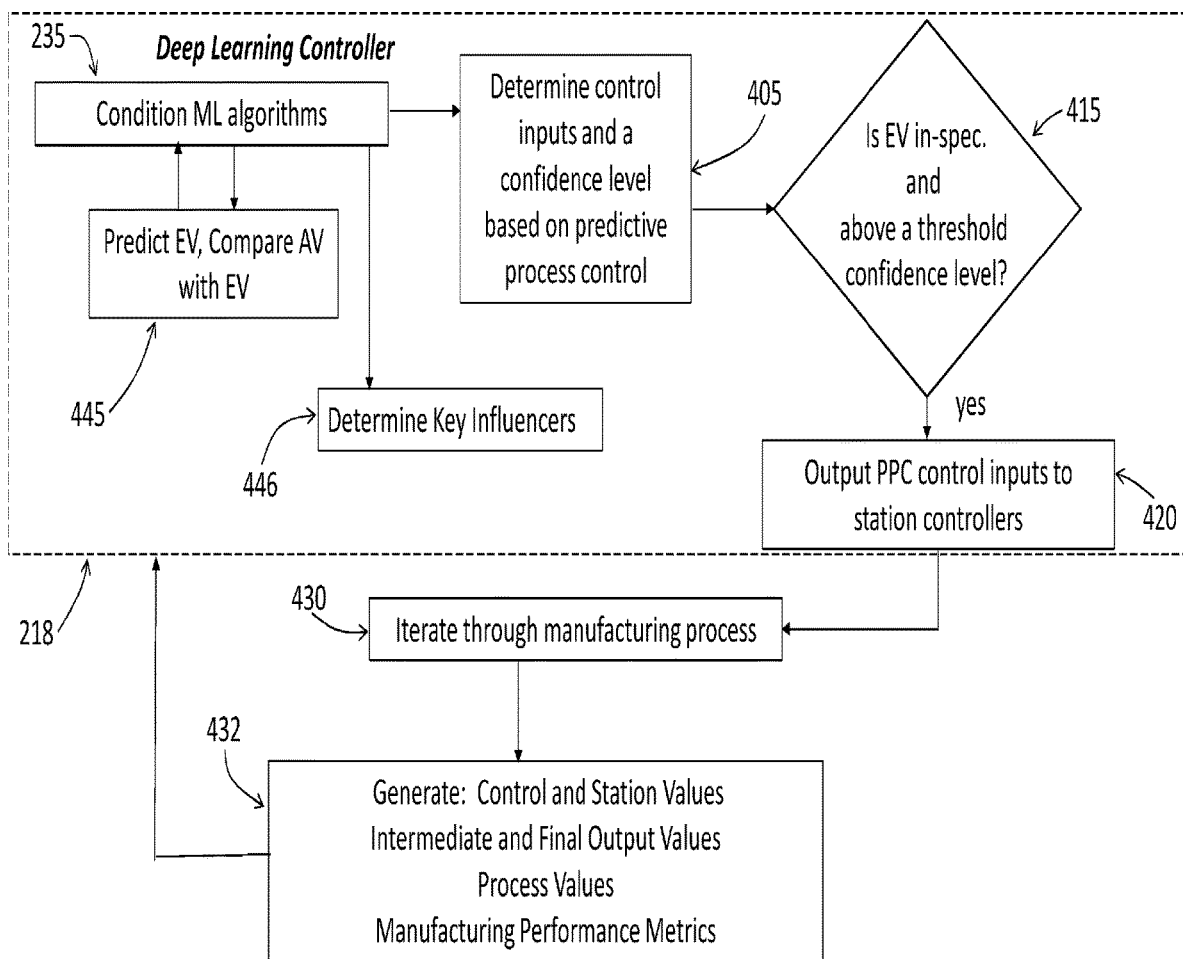
FIG. 4 shows an example method for implementing predictive process control.

FIG. 4, shows an example process for controlling the manufacturing process using predictive process control.

Deep learning controller 218 uses its conditioned machine learning algorithms (as discussed in connection with FIG. 3) to calculate control inputs for the station controllers associated with the process stations of a manufacturing process. Based on the calculated control inputs, deep learning controller 218 can predict the expected value (EV) of the final output for the manufacturing process, along with a confidence level for its prediction (step 405). If deep learning controller 218 determines, with a threshold confidence level, that the expected value will be in specification (step 415), then deep learning controller 218 can output the calculated control inputs to the station controllers associated with the process stations of the manufacturing process (step 420). Deep learning controller 218 can calculate and provide the calculated control inputs to one or more station controllers at the outset or continuously throughout the manufacturing process. The control inputs do not have to be provided to the station controllers in serial order, but can be provided to one or more station controllers in parallel or in any order that is suitable to produce final outputs that are in specification. Each station controller that receives control inputs from deep learning controller 218 can send control signals to its associated station to control the control values (e.g., control the control values so that they match the received setpoints). The machine learning algorithms continue to be improved throughout the implementation of PPC (step 335). Further, the functional and experiential priors can be dynamically updated throughout PPC.

At step 430, the manufacturing process proceeds through all the process stations serially or in parallel. As the process iterates through each station, all the values associated with: an individual station (e.g., control values); an output of an individual station (e.g., station values, intermediate/final output values), or multiple stations (e.g., process values) can be measured or calculated and provided to condition the machine learning algorithms of deep learning controller 218 (steps 432). Further, manufacturing performance metrics for the manufacturing process under predictive process control can be calculated and provided to deep learning controller 218 (step 432). The process values and manufacturing performance metrics calculated under PPC can be compared to the process values and manufacturing performance metrics calculated under conventional control to determine the improvements provided by predictive process control.

Throughout the process shown in FIG. 4, deep learning controller 218 can predict the expected value (EV) for the final output, determine whether the expected value for the final output is in-specification, determine the confidence level for its prediction, and then provide feedback on its prediction by comparing the expected final value to the actual final value (step 445). Further, if deep learning controller 218 determines that the final output is not in-specification, it can calculate adjustments to the control inputs, so that the predicted expected value for the final output is in-specification.

In some aspects, deep learning controller 218 can be configured to perform EV predictions regarding intermediate outputs on a station-by-station basis. That is, deep learning controller 218 can make EV predictions regarding outputs at a specific station, determine whether the EV for an intermediate output is in-specification, determine the confidence level for its prediction, and subsequently compare those predictions to actual outputs observed at that station. Alternatively, EV predictions can be made for outputs resulting from combined processing performed by two or more stations, depending on the desired implementation. Further, if deep learning controller 218 determines that the intermediate output is not in-specification, it can calculate adjustments to the control inputs, so that the predicted expected value for the intermediate output is in-specification.

Note, if the confidence level determined by deep learning controller 218 is below a predetermined threshold, then control of the manufacturing process can revert back to conventional control, as described in connection with FIG. 3.

In some embodiments, deep learning controller 218 can also monitor whether any of the station/control/process or intermediate output values are unacceptable and make further adjustments to the station controller inputs or generate an alert if the problem cannot be fixed by adjusting the station controller inputs.

Based on data it receives as the stations run through the manufacturing process, deep learning controller 218 can adjust the control inputs for one or more station controller. In further embodiments, deep learning controller 218 can, not only initialize the station controller inputs before the start of an iteration through the process stations of the manufacturing process, but also adjust station controller inputs during the process itself ("feedforward control"). In particular, based on information received from prior stations in a manufacturing process, deep learning controller 218 can make changes to the control inputs associated with later stations in the process. For example, if deep learning controller 218 determines that there are defects in the intermediate output of a particular station, then deep learning controller 218 can determine whether there are any corrective actions that can be taken at subsequent stations, so that the final output will be in specification. Deep learning controller 218 can also make changes to the current and prior processing stations in real-time, based on feedback about control/station/process values and/or intermediate/final output values ("feedback control"). This ability to dynamically control each station in real time and make adjustments to downstream station controllers to compensate for errors, miscalculations, undesirable conditions or unforeseen outcomes that occurred upstream, increases the likelihood of manufacturing in specification final outputs. Further, even though a broad range of final output values can be considered in specification, it may be desirable to manufacture final outputs that are of the same or similar quality and have similar final output values within a narrower range of acceptable final output values. Feedback and feedforward control, along with the deep learning controller's predictive capabilities, enable deep learning controller 218 to adjust the station controllers to produce final output values of consistent quality and similar final output values.

It is useful to identify what parameters of the manufacturing process most impact the final output value or the process performance (the "key influencers"). Deep learning controller 218 can consider all parameters of the manufacturing process (e.g., one or more control values, one or more station values, one or more process values, one or more stations, one or more intermediate outputs or any combination thereof), and using one or more of its machine learning algorithms can identify the key influencers. In some aspects, deep learning controller 218 can employ unsupervised machine learning techniques to discover one or more key influencers, for example, wherein each key influencer is associated with one or more parameters (or parameter combinations) that affect characteristics of various station outputs, the final output, and/or process performance. It is understood that discovery of key influencers and their associated parameters may be performed through operation and training of deep learning controller 218, without the need to explicitly label, identify or otherwise output key influencers or parameters to a human operator.

In some approaches, deep learning controller 218 can rank, in order of significance, the impact of each parameter of the manufacturing process on the final output value or the process performance. A key influencer, can be identified based on: a cutoff ranking (e.g., the top 5 aspects of the manufacturing process that impact the final output value), a minimum level of influence (e.g., all aspects of the manufacturing process that contribute at least 25% to the final output value); or any other suitable criteria. In some aspects, key influence characteristics may be associated with a quantitative score, for example, that is relative to the weight of influence for the corresponding characteristic.

Deep learning controller 218 can continuously, throughout the manufacturing process, calculate the key influencers (step 446).

In some embodiments, as described in connection with FIG. 5, the key influencers can be used to help build a more robust data set to train deep learning controller 218.

In conventional manufacturing, the data generated from the manufacturing process is limited, because the goal is to produce intermediate output values that are within a specified standard variation from the mean. As a consequence, the range of control inputs, control/station/process values are also limited, because they are all designed to produce intermediate output values that are within a specified range from the mean. In contrast, under the subject disclosure, as long as the final output is in specification, the intermediate output values do not have to be within a specific range from the mean. As the deep learning controller's predictions become more accurate, in some embodiments, deep learning controller 218 can intentionally make changes to control inputs, to create the conditions for generating intermediate output values that may exceed the normal fluctuations of an in control process under traditional manufacturing process control (e.g., SPC), but still generates final outputs that are in specification. This creates a more robust data training set for deep learning controller 218 to detect patterns and determine how particular stations, station/control/process values, and intermediate output values impact the final output value (e.g., whether the final output is in specification or not). The creation of a robust data set can occur both during and prior to implementation of deep learning controller 218 in a production environment.

Figure 5:
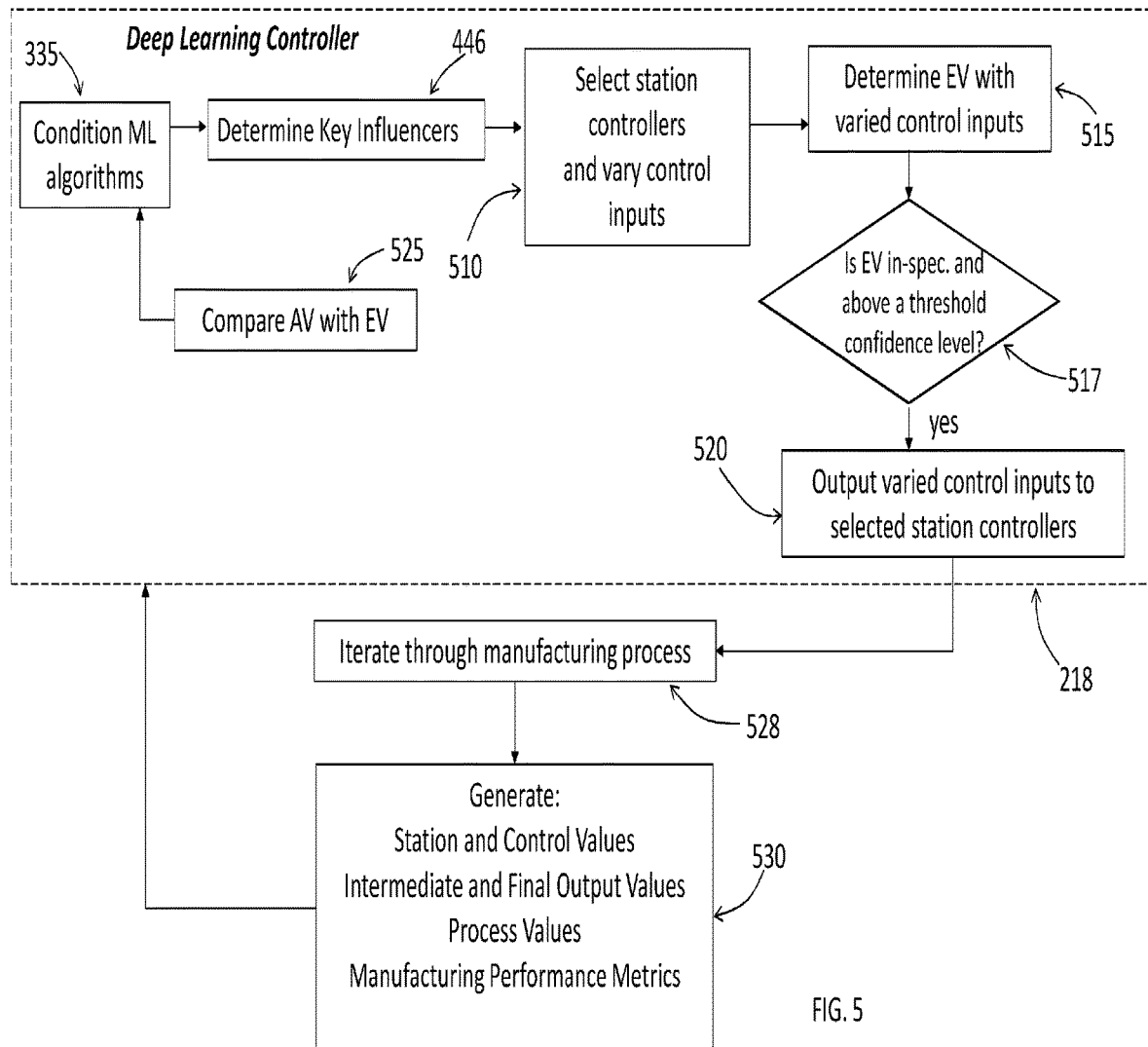
FIG. 5 shows an example method for creating a robust data training set using predictive process control.

FIG. 5, shows an example process for creating a more robust data set. In some embodiments, deep learning controller 218 can adjust known controller inputs (e.g., control setpoints) to one or more station controllers to produce intermediate output values that may exceed a specified range from the mean. For example, once deep learning controller 218 is conditioned (step 335), it knows at least some control inputs for each station controller that will result in final output values that are in specification. In some embodiments, deep learning controller 218 can select one or more station controllers and vary the known control inputs (e.g., setpoints) to the selected station controller(s) by a predetermined threshold (e.g., new setpoint=original setpoint+1% original setpoint) (step 510). Deep controller 218 can predict the expected value (EV) of the final output for the manufacturing process using the newly calculated control inputs, along with a confidence level for its prediction (step 515). If deep learning controller 218 determines, with a threshold confidence level, that the expected value will be in specification (step 517), then deep learning controller 218 can provide the adjusted control inputs to the selected station controllers (step 520). Deep learning controller 218 can also compare the predicted expected values with the actual final output values (AV) to provide feedback on its predictions and to further adjust the control inputs (step 525).

In one example embodiment, control inputs related to material tolerances can be purposely varied, and deep learning controller 218 can be used to determine what adjustments to make to other control inputs to produce in specification final products. By training deep learning controller 218 in this manner, when new materials are introduced into the manufacturing process unexpectedly, deep learning controller 218 can adapt the control inputs on its own, without requiring operator input. Similarly, adjustments can purposely be made to control algorithms (e.g., adjustments that mimic a virus or other attack), and deep learning controller 218 can be used to determine what adjustments to make to other control inputs to produce in specification final products. By purposely introducing these changes, deep learning controller 218 can adapt the control inputs on its own, without requiring operator input, when adjustments are made to the control algorithms unexpectedly during the manufacturing process.

In some embodiments, deep learning controller 218 can first determine the key influencers (step 446 as described in connection with FIG. 4) and vary the control inputs associated with the key influencers. In other embodiments, deep learning controller 218 can vary control inputs for all the station controllers, or select station controllers according to a predetermined formula. To create a robust data set, deep learning controller 218 can continue to adjust the control inputs associated with specific station controllers each time it iterates through the manufacturing process (step 528). For example, deep learning controller 218 can adjust the setpoints associated with the key influencers by 1% and iterate through the manufacturing process one or more times. On a subsequent iteration, deep learning controller 218 can adjust the setpoints associated with the key influencers by another 1%, and iterate through the manufacturing process one or more times. Deep learning controller 218 can keep making adjustments, as long as the expected values for the manufacturing process using the adjusted setpoints will result in final output values that are in specification with a threshold confidence level. During each iteration, as described in connection with FIG. 4, station/control values, intermediate/final output values, process values and manufacturing performance metrics are generated (step 430) and used to condition the machine learning algorithms of deep learning controller 218 (step 335), and to dynamically update the functional and experiential priors.

The following example, further illustrates creating a robust data set by varying a control input (e.g., a temperature setpoint for a particular station). In this example, the setpoint temperature for a specific station is 95°, and the actual temperature of the station fluctuates between 92°-98° (i.e., 3° above and below the setpoint temperature). The setpoint temperature at 95° and the corresponding ±3° fluctuation of the actual station temperature all result in final output values that are in specification. Deep learning controller 218 can then predict if adjusting the temperature setpoint by a negligible amount (e.g., ±0.5°), will still result in final output values that are in specification. If deep learning controller 218 predicts in specification final output values, at a threshold confidence level, for a manufacturing process using adjusted temperature setpoints, then deep learning controller 218 will adjust the temperature setpoint by ±0.5°. Assuming the same station temperature fluctuation of ±3° from the setpoint, then the actual station temperature, will range from 92.5°-98.5°, when the setpoint is 95.5°; and will range from 91.5°-97.5° when the setpoint is 94.5°. Deep learning controller 218 can compare the final output value with expected output value over the temperature range 91.5°-98.5°, and determine whether it correctly predicted that the final output value would be in specification. Because the temperature setpoint was adjusted by ±0.5°, the resulting data set covers a broader temperature range: 91.5°-98.5 than the original temperature range of 92°-98°.

Note, that instead of changing station controller setpoints, control values of a station can be changed by modifying other control inputs to the station controller (e.g., control values) that would achieve the same goal of changing the setpoints. For example, assume the following: setpoint for a station controller is 100 degrees, actual station temperature value (i.e., a control value) is 100 degrees, and the goal is to increase the actual temperature value of the station by two degrees. Instead of increasing the temperature setpoint to 102 degrees to achieve that change, deep learning controller 218 can change the control value that it provides to the station controller by two degrees below the actual temperature value (e.g., changing the control value from 100 degrees to 98 degrees), causing the station controller to increase the station temperature by two degrees to achieve the desired station temperature increase of two degrees (i.e., 102 degrees). It may be necessary to change control values, instead of setpoints, when existing station controls do not allow setpoints to be changed.

In some embodiments, as described in connection with FIG. 6, the key influencers can be used to optimize the final output or process values.

Once the most important stations, station/control/process values, intermediate output values that influence the final output value or the process performance are identified, then resource allocation and process optimization can target the key influencers. For example, instead of collecting volumes of data that marginally impact the process, data resources (e.g., collection, processing and storage) can be allocated largely for the data associated with the key influencers ("curated data"). Further, the curated data (a subset of all the data available from the manufacturing process) can be provided to machine learning algorithms to make optimizations to the key influencers, reducing the volume of training examples and increasing the resources available to process the curated data. In addition, the machine learning algorithms can be directed to optimizing the key influencers, instead of the entire process, reducing the possible states and actions that a machine learning algorithm must consider, and allocating resources more efficiently and intelligently. For example, in reinforcement learning, state and action spaces define the range of possible states an agent might perceive and the actions that are available to the agent. By using reinforcement learning only on the key influencers, the state and action spaces are reduced, making the algorithm more manageable.

In some embodiments, an operator can specify one or more characteristics of the final output or the process values that it would like to optimize for (e.g., using the least amount of power or resources, fastest throughput, minimum number of defects, greatest tensile strength). Deep learning controller 218 can run machine learning models like reinforcement learning, targeting the key influencers, to optimize for the specified characteristics of the final output ("optimal design values") and/or specified process values ("optimal process values").

Figure 6:
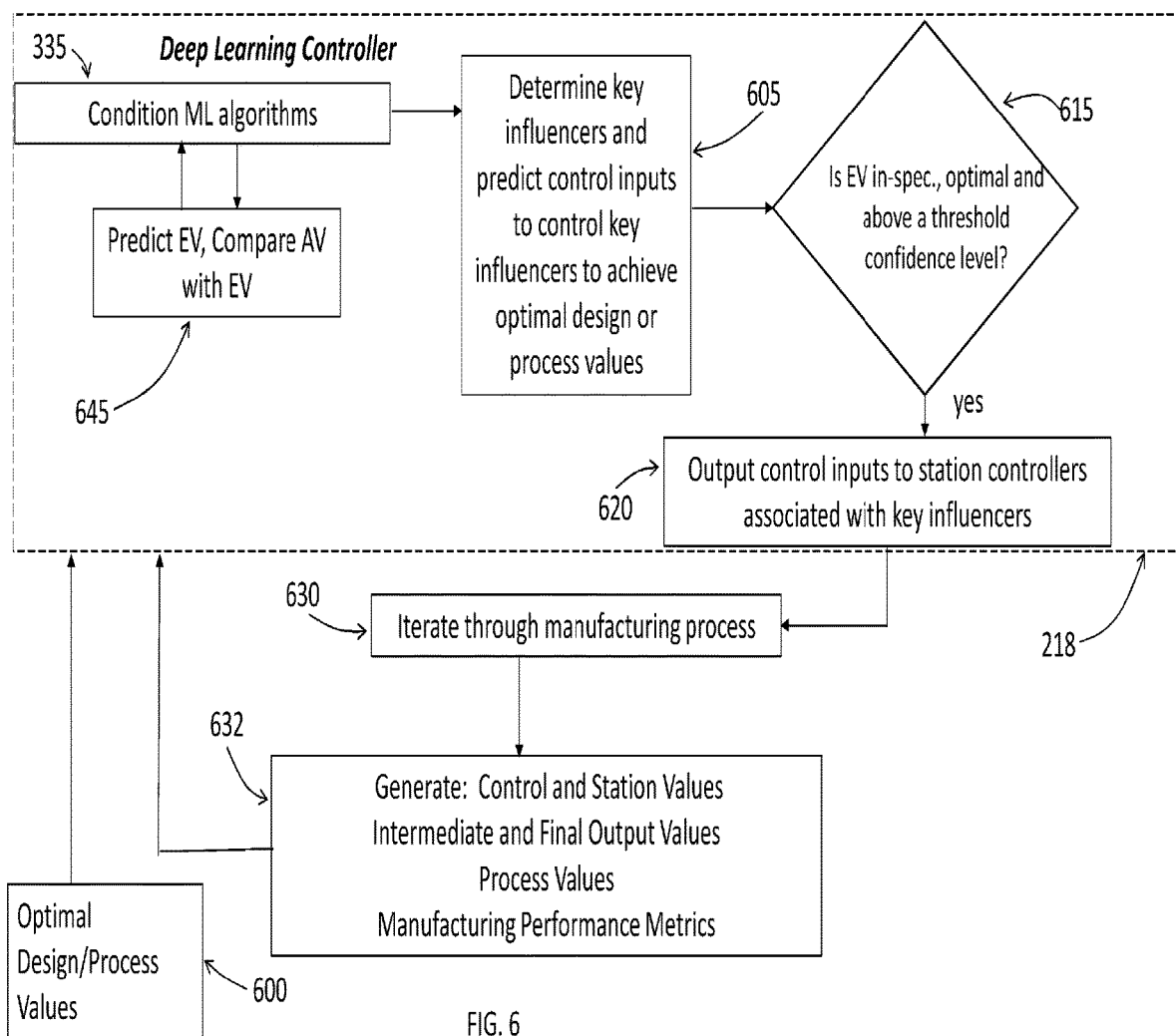
FIG. 6 shows an example method for optimizing a manufacturing process using predictive process control.

FIG. 6, according to some embodiments of the subject disclosure, shows a process for specifying optimal design/process values, and using a deep learning controller to control and optimize the key influencers to achieve the desired optimal design or process values.

At 600, the desired optimal design/process values are provided to deep learning controller 218. For example, generate an in specification final output: using the least amount of power or resources, fastest throughput, minimum number of defects, greatest tensile strength, etc.

As shown at 605, deep learning controller 218 can determine the key influencers for driving in specification products (see also FIG. 4), and can predict the control inputs ("optimal control inputs") to control each key influencer to achieve the desired optimal design or process values. Deep learning controller 218 can determine the expected value of the final output for the manufacturing process using the optimal control inputs, and predict whether the expected value will be in specification and achieve the desired optimal design or process values (step 615). Deep learning controller 218 can also calculate a confidence level that the optimal control inputs will result in optimal design or process values (step 615). Deep learning controller 218 can provide the optimal control inputs to the relevant station controllers at the outset and continuously throughout the manufacturing process (step 620). The optimal control inputs do not have to be provided to the station controllers in serial order, but can be provided to one or more station controllers in parallel or in any order that is suitable to produce final outputs that achieve the desired optimal design or process values.

In other embodiments, the parameters for final outputs that are in specification will be updated to match the desired optimal design/process values. For example, if in specification tensile strength for a final output is 40-90 megapascals (MPa), and optimal tensile strength for the final output is determined to be 70-90 MPa, then the in specification parameters can be updated to 70-90 MPa. Deep learning controller 218 can predict, and determine the confidence level, that the calculated control inputs for the station controllers associated with key influencers will achieve the updated specification parameters (i.e., 70-90 MPa). Deep learning controller 218 can update the relevant station controllers when it predicts that the calculated control inputs will achieve the updated specification parameters, at a confidence level above a predefined threshold.

Note, deep learning controller 218 can continue to provide control inputs to the other station controllers as discussed in connection with FIG. 3, but the optimization will just target the station controllers associated with the key influencers. In some embodiments, deep learning controller 218 can optimize the station controllers associated with any station, station/control/process value or intermediate output value, not just the key influencers.

Deep learning controller 218 can also compare the expected values with the actual values to provide feedback on its prediction and to further adjust the control inputs (step 545). As the process begins and goes through all the stations, in some embodiments, only measurements related to the key influencers, as well as measurements for the final output, will be collected and provided to deep learning controller 218. In other embodiments, deep learning controller 218 can continue to collect data from all the process stations. The data will be used to continuously improve the control inputs for the key influencers, so that the optimal design/process values are achieved consistently and with a high confidence level.

Note that the desired optimal design/process values can be changed at any time. Further, new key influencers can be calculated by changing the criteria for what qualifies as a key influencer (e.g., a first criteria might classify as key influencers the top 5 stations that drive in-specification final outputs, while an updated criteria might classify as key influencers only the top 3 stations that drive in-specification final outputs). Further, once deep learning controller 218 predicts control inputs to achieve optimal design/process value with a certain confidence level over a period of time, deep learning controller 218 can identify which of the key influencers are key influencers for driving the desired optimizations and only target that subset of key influencers, further reducing the possible actions/states that a machine learning algorithm must consider and more efficiently allocating the resources to that subset.

In further embodiments, deep learning controller 218 can, not only initialize the station controller inputs for the key influencers before the start of an iteration through the process stations of the manufacturing process, but also adjust the control inputs during the process itself. In particular, based on information received from prior stations in a process, deep learning controller 218 can make changes to the control inputs associated with later stations in the process to ensure the optimal design/process values are achieved. Deep learning controller 218, can also adjust prior stations in the process as it proceeds through the process and receives data from subsequent stations.

In some embodiments manufacturing performance metrics for the manufacturing process trying to achieve optimal design or process values can be calculated and provided to deep learning controller 218 (step 632). These manufacturing performance metrics can be compared to the manufacturing performance metrics for PPC and/or the manufacturing performance metrics for conventional control to determine the improvements provided by optimizing the design and or process.

An example of manufacturing system optimization to reduce the possible actions/states that can be adapted and implemented by deep learning controller 218 is described in U.S. Patent Provisional Application 62/836,199 "Adaptive Methods and Real-Time Decision Making for Manufacturing Control," which is hereby incorporated by reference herein in its entirety. The disclosed method is just an example and is not intended to be limiting.

Another example of manufacturing system optimization to reduce the possible actions/states that a machine learning algorithm must consider that can be adapted and implemented by deep learning controller 218 of the subject disclosure is described in U.S. Patent Provisional Application 62/836,213 "TRANSFER LEARNING APPROACH TO MULTI-COMPONENT MANUFACTURING CONTROL," which is hereby incorporated by reference herein in its entirety. The disclosed method is just an example and is not intended to be limiting.

Figure 7:
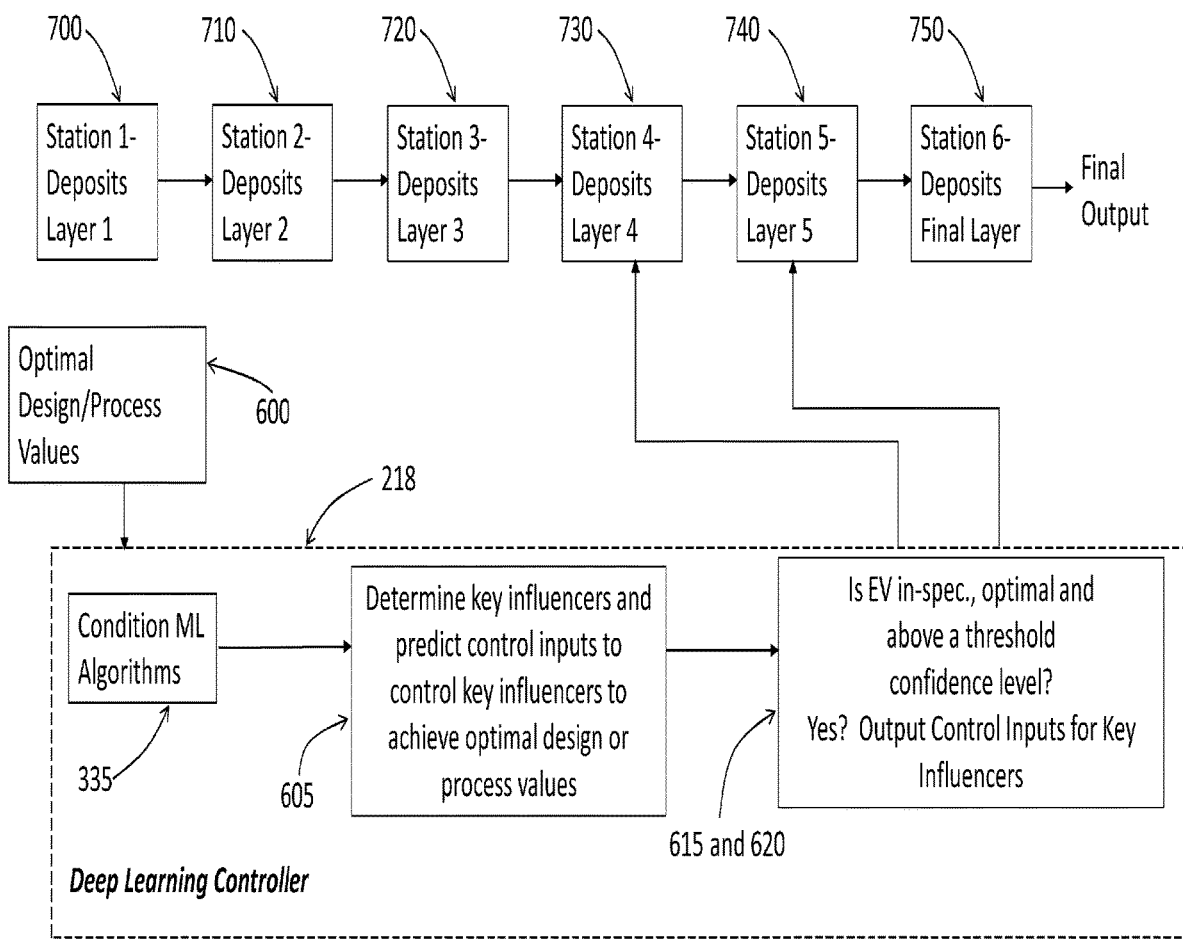
FIG. 7 shows a practical application of optimizing a manufacturing process using predictive process control.

FIG. 7 illustrates an example manufacturing system that can apply predictive process control to optimize the design/process of a final output. Specifically, a 3D manufacturing system can have a number of process stations (e.g., stations 700-750), and each process station can perform a process step (e.g., deposit an extruded layer of material that will result in a final output). Using predictive process control, as described in FIG. 6, an operator can specify what it wants to optimize for (e.g., the tensile strength of the final output) (step 600). Further, deep learning controller 218 can determine the key influencers (step 605) that impact the tensile strength of a final output (e.g., changes to the volume of deposited material per layer and changes to extruder velocity control). Deep learning controller 218 can reduce the possible actions/states that a machine learning algorithm must consider by running machine learning algorithms (e.g., reinforcement learning) to optimize only the key influencers, and not optimize other control attributes (e.g., extruder nozzle temperature, printing pattern of the print head, etc. Further), deep learning controller 218 can identify which extruded layers (e.g., layers 4 and 5) have the most impact on tensile strength, and optimize the key influencers for the stations that deposit those layers (e.g., stations 4 and 5).

Note, in some embodiments, in connection with predictive process control method discussed in FIGS. 4-7, the conventional station controllers can be turned off and deep learning controller 218 can control the process stations directly.

Figure 8:
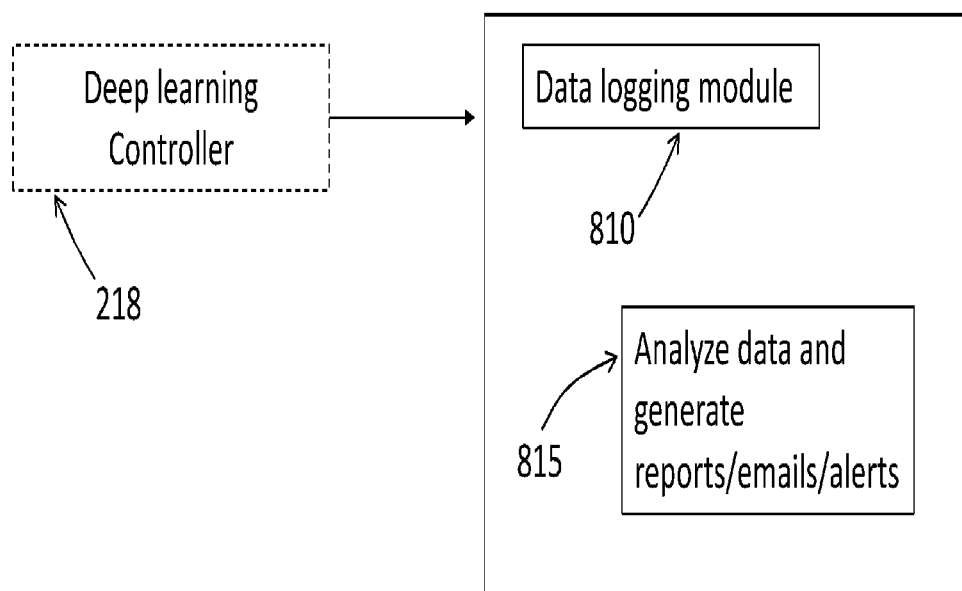
FIG. 8 shows an example method for logging and creating data outputs.

Further, in some embodiments of predictive process control, a data logging module 810, as shown in FIG. 8, can be configured to receive data from deep learning controller 218, to analyze the data and to generate reports, emails, alerts, log files or other data outputs (step 815). For example, data logging module 810 can be programmed to search the received data for predefined triggering events, and to generate reports, emails, alerts, log files or other data outputs showing relevant data associated with those triggering events (step 815). For example, adjusting a setpoint or other control input can be defined as a triggering event and the following data can be reported: name of setpoint or other control input that was adjusted, the station that was affected, date and time of day, the confidence level associated with the adjusted control input, whether the adjusted control input achieved in-specification final outputs or optimal design/process values, reasons for why the adjustment was made. In another example, achieving or not achieving optimal design/process values can be defined as triggering event and the following data can be reported: control inputs for the key influencers, date and time of day, any reported outages, confidence level for the control inputs, throughput time, resources expended. associated operator. Other suitable triggers can be defined, and other suitable data can be reported. The data logging module can also compare process values, final output values, manufacturing performance metrics that were collected during the manufacturing process using conventional control with process values, final output values, manufacturing performance metrics that were collected during the manufacturing process using predictive performance control. In some embodiments, data logging module 810 can be included within deep learning controller 218.

Figure 9:
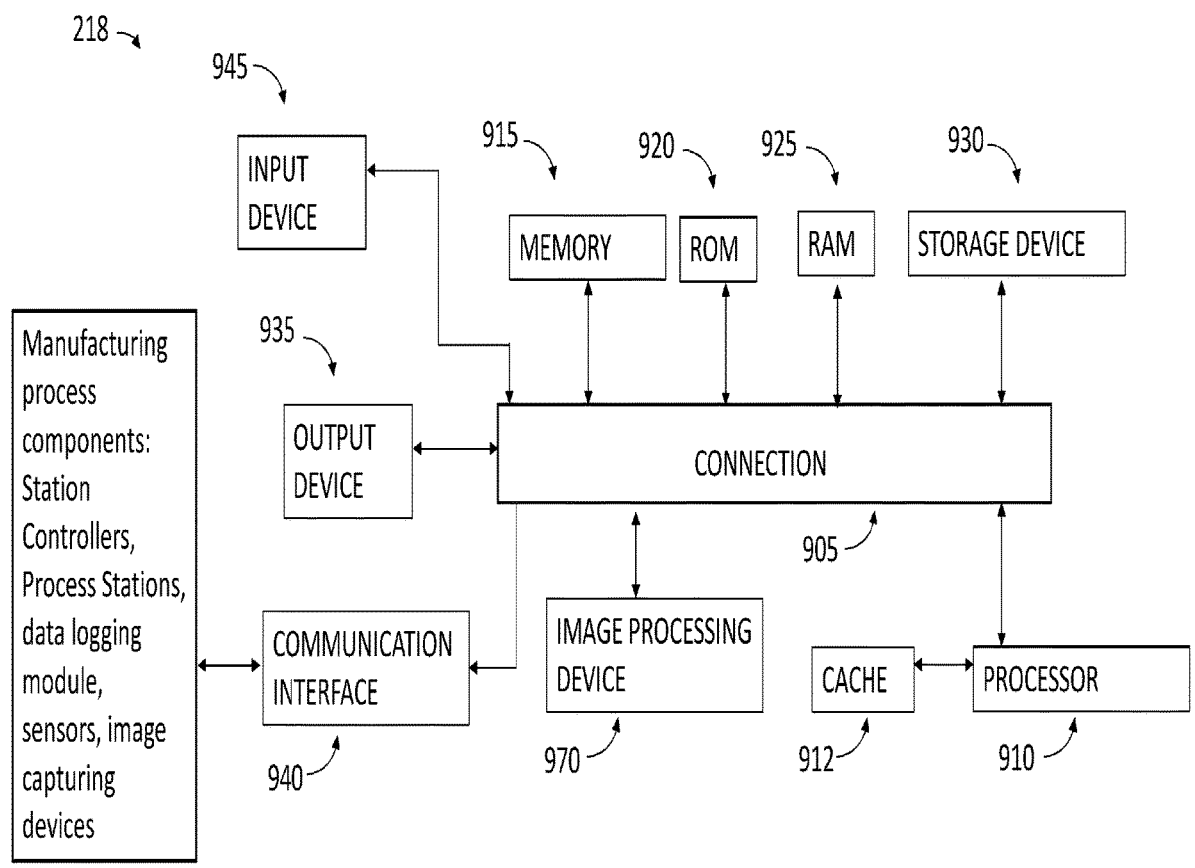
FIG. 9 shows the general configuration of an embodiment of a deep learning controller that can implement predictive process control.

FIG. 9 shows the general configuration of an embodiment of deep learning controller 218 that can implement predictive process control, in accordance with some embodiments of the disclosed subject matter. Although deep learning controller 218 is illustrated as a localized computing system in which various components are coupled via a bus 905, it is understood that various components and functional computational units (modules) can be implemented as separate physical or virtual systems. For example, one or more components and/or modules can be implemented in physically separate and remote devices, such as, using virtual processes (e.g., virtual machines or containers) instantiated in a cloud environment.

Deep learning controller 218 can include a processing unit (e.g., CPU/s and/or processor/s) 910 and bus 905 that couples various system components including system memory 915, such as read only memory (ROM) 920 and random access memory (RAM) 925, to processing unit 910. Processing unit 910 can include one or more processors such as a processor from the Motorola family of microprocessors or the MIPS family of microprocessors. In an alternative embodiment, the processing unit 910 can be specially designed hardware for controlling the operations of deep learning controller 218 and performing predictive process control. When acting under the control of appropriate software or firmware, processing module 910 can perform various machine learning algorithms and computations of PPC described herein.

Memory 915 can include various memory types with different performance. characteristics, such as memory cache 912. Processor 910 can be coupled to storage device 930, which can be configured to store software and instructions necessary for implementing one or more functional modules and/or database systems. Each of these modules and/or database systems can be configured to control processor 910 as well as a special-purpose processor where software instructions are incorporated into the actual processor design.

To enable operator interaction with deep learning controller 218, input device 945 can represent any number of input mechanisms, such as a microphone for speech, a touch-sensitive screen for gesture or graphical input, keyboard, mouse, motion input and so forth. An output device 935 can also be one or more of a number of output mechanisms (e.g., printer, monitor) known to those of skill in the art. In some instances, multimodal systems can enable an operator to provide multiple types of input to communicate with deep learning controller 218. Communications interface 940 can generally govern and manage the operator input and system output, as well as all electronic input received from and sent to other components that are part of a manufacturing process such as the station controllers, process stations, data logging module, and all associated sensors and image capturing devices. There is no restriction on operating on any particular hardware arrangement and therefore the basic features here may easily be substituted for improved hardware or firmware arrangements as they are developed. Data output from deep controller 218 can be displayed visually, printed, or generated in file form and stored in storage device 930 or transmitted to other components for further processing.

Communication interface 940 can be provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow processing unit 910 to efficiently perform machine learning and other computations necessary to implement predictive process control. Communication interface 940 can be configured to communicate with the other components that are part of a manufacturing process such as the station controllers, process stations, data logging module, and all associated sensors and image capturing devices.

Sensors associated with a manufacturing process can include sensors that existed prior to implementation of PPC, as well as any new sensors that were added to perform any additional measurements used by PPC. One or more sensors can be included within or coupled to each station. Sensors can be used to measure values generated by a manufacturing process such as: station values, control values, intermediate and final output values. Further, information provided by sensors can be used by deep learning controller 218, or by a module external to deep learning controller 218 to compute process values and performance manufacturing metrics. Example sensors can include, but are not limited to: rotary encoders for detecting position and speed; sensors for detecting proximity, pressure, temperature, level, flow, current and voltage; limit switches for detecting states such as presence or end-of-travel limits. Sensor, as used herein, includes both a sensing device and signal conditioning. For example, the sensing device reacts to the station or control values and the signal conditioner translates that reaction to a signal that can be used and interpreted by deep learning controller. Example of sensors that react to temperature are RTDs, thermocouples and platinum resistance probes. Strain gauge sensors react to pressure, vacuum, weight, change in distance among others. Proximity sensors react to objects when they are within a certain distance of each other or a specified tart. With all of these examples, the reaction must be converted to a signal that can be used by deep learning controller 218. In many cases the signal conditioning function of the sensors produce a digital signal that is interpreted by deep learning controller 218. The signal conditioner can also produce an analog signal or TTL signal among others.

In some embodiments, deep learning controller 218 can include an imaging processing device 970 that processes images received by various image capturing devices such as video cameras, that are coupled one or more processing station and are capable of monitoring and capturing images of intermediate and final outputs. These images can be transmitted to deep learning controller 218 via communication interface 940, and processed by image processing device 970. The images can be processed to provide data, such as number and type of defects, output dimensions, throughput, that can be used by deep learning controller 218 to compute intermediate and final output values. In some embodiments, the image processing device can be external to deep learning controller 218 and provide information to deep learning controller 218 via communication interface 940.

Storage device 930 is a non-transitory memory and can be a hard disk or other types of computer readable media that can store data accessible by a computer, such as magnetic cassettes, flash memory cards, solid state memory devices, digital versatile disks, cartridges, random access memories (RAMs) 825, read only memory (ROM) 820, and hybrids thereof.

In practice, storage device 930 can be configured to receive, store and update input data to and output data from deep learning controller 218, for example functional priors, experiential priors, universal input; pre-process inputs; in-process inputs and post-process inputs.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 300 can practice all or part of the recited methods, can be a part of the recited systems, and/or can operate according to instructions in the recited non-transitory computer-readable storage media. Such logical operations can be implemented as modules configured to control the processor 363 to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The predictive process control apparatus, method and system have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

STATEMENTS OF THE DISCLOSURE

Statement 1: A computer-implemented method comprising: receiving a plurality of control values from two or more stations, at a deep learning controller, wherein the control values are generated at the two or more stations deployed in a manufacturing process; predicting, by the deep learning controller, an expected value for an intermediate or final output of an article of manufacture, based on the control values; determining, by the deep learning controller, if the predicted expected value for the article of manufacture is in-specification; and generating, by the deep learning controller, one or more control inputs if the predicted expected value for the article of manufacture is not in-specification, wherein the one or more control inputs are configured to cause an intermediate or final output for the article of manufacture to be in-specification.

Statement 2: The computer-implemented method of statement 1, further comprising: outputting the one or more control inputs to one or more station controllers, if a confidence level associated with the one or more control inputs exceeds a predetermined threshold.

Statement 3: The computer-implemented method of any of statements 1-2, wherein outputting the one or more control inputs to the one or more station controllers, further comprises: providing a first control input to a first station controller associated with a first station; and providing a second control input to a second station controller associated with a second station, and wherein the second station is downstream from the first station in the manufacturing process.

Statement 4: The computer-implemented method of any of statements 1-3, wherein predicting the intermediate or final output of the article of manufacture, further comprises: identifying one or more key influencers associated with the manufacturing process; and adjusting one or more control inputs associated with at least one of the one or more key influencers.

Statement 5: The computer-implemented method of any of statements 1-4, further comprising: permitting control of the manufacturing process by the one or more station controllers, if the predicted expected value for the article of manufacture is in-specification.

Statement 6: The computer-implemented method of any of statements 1-5, further comprising: receiving a plurality of station values at the deep learning controller, wherein the station values are associated with the one or more stations, and wherein predicting the expected value of the article of manufacture is further based on the station values.

Statement 7: The computer-implemented method of any of statements 1-6, wherein the plurality of control values comprises one or more of: speed, temperature, pressure, vacuum, rotation, current, voltage, resistance, or power.

Statement 8: A system comprising: one or more processors; and a non-transitory memory storing instructions that, when executed by the one or more processors, cause the one or more processors to perform operations comprising: receiving a plurality of control values from two or more stations, at a deep learning controller, wherein the control values are generated at the two or more stations deployed in a manufacturing process; predicting, by the deep learning controller, an expected value for an intermediate or final output of an article of manufacture, based on the control values; determining, by the deep learning controller, if the predicted expected value for the article of manufacture is in-specification; and generating, by the deep learning controller, one or more control inputs if the predicted expected value for the article of manufacture is not in-specification, wherein the one or more control inputs are configured to cause an intermediate or final output for the article of manufacture to be in-specification.

Statement 9: The system of statement 8, wherein the processors are further configured to perform operations comprising: outputting the one or more control inputs to one or more station controllers, if a confidence level associated with the one or more control inputs exceeds a predetermined threshold.

Statement 10: The system of any of statements 8-9, wherein outputting the one or more control inputs to the one or more station controllers, further comprises: providing a first control input to a first station controller associated with a first station; and providing a second control input to a second station controller associated with a second station, and wherein the second station is downstream from the first station in the manufacturing process.

Statement 11: The system of any of statements 8-10, wherein predicting the expected value of the article of manufacture, further comprises: identifying one or more key influencers associated with the manufacturing process; and adjusting one or more control inputs associated with at least one of the one or more key influencers.

Statement 12: The system of any of statements 8-11, further comprising: permitting control of the manufacturing process by the one or more station controllers, if the predicted expected value for the article of manufacture is in-specification.

Statement 13: The system of any of statements 8-12, wherein the processors are further configured to perform operations comprising: receiving a plurality of station values at the deep learning controller, wherein the station values are associated with the one or more stations, and wherein predicting the expected value for the article of manufacture is further based on the station values.

Statement 14: The system of any of statements 8-13, wherein the plurality of control values comprises one or more of: speed, temperature, pressure, vacuum, rotation, current, voltage, resistance, or power.

Statement 15: A non-transitory computer-readable storage medium comprising instructions stored therein, which when executed by one or more processors, cause the one or more processors to perform operations comprising: receiving a plurality of control values from two or more stations, at a deep learning controller, wherein the control values are generated at the two or more stations deployed in a manufacturing process; predicting, by the deep learning controller, an expected value for the intermediate or final output of an article of manufacture, based on the control values; determining, by the deep learning controller, if the predicted expected value for the article of manufacture is in-specification; and generating, by the deep learning controller, one or more control inputs if the predicted expected value for the article of manufacture is not in-specification, wherein the one or more control inputs are configured to cause an intermediate or final output for the article of manufacture to be in-specification.

Statement 16: The non-transitory computer-readable storage medium of statement 15, further comprising instructions configured to cause the one or more processors to perform operations comprising: outputting the one or more control inputs to one or more station controllers, if a confidence level associated with the one or more control inputs exceeds a predetermined threshold.

Statement 17: The non-transitory computer-readable storage medium of any of statements 15-16, wherein outputting the one or more control inputs to the one or more station controllers, further comprises: providing a first control input to a first station controller associated with a first station; and providing a second control input to a second station controller associated with a second station, and wherein the second station is downstream from the first station in the manufacturing process.

Statement 18: The non-transitory computer-readable storage medium of any of statements 15-17, wherein predicting the expected value of the article of manufacture, further comprises: identifying one or more key influencers associated with the manufacturing process; and adjusting one or more control inputs associated with at least one of the one or more key influencers.

Statement 19: The non-transitory computer-readable storage medium of any of statements 15-18, further comprising instructions configured to cause the one or more processors to perform operations comprising: permitting control of the manufacturing process by the one or more station controllers, if the predicted expected value for the article of manufacture is in-specification.

Statement 20: The non-transitory computer-readable storage medium of any of statements 15-19, further comprising instructions configured to cause the one or more processors to perform operations comprising: receiving a plurality of station values at the deep learning controller, wherein the station values are associated with the one or more stations, and wherein predicting the expected value of the article of manufacture is further based on the station values.

The invention claimed is:

1. A computer-implemented method comprising:
receiving a first set of in-process inputs from a first processing station, at a deep learning controller, wherein the first set of in-process inputs are generated at the first processing station deployed in a manufacturing process, wherein the first set of in-process inputs are attributes of the first processing station of a plurality of stations in the manufacturing process;
predicting, by the deep learning controller, an expected value for an intermediate value at a downstream processing station or a final output of an article of manufacture, based on the first set of in-process inputs;
determining, by the deep learning controller, that the expected value for the article of manufacture is not in-specification;
based on the determining, generating, by the deep learning controller, one or more control inputs, wherein the one or more control inputs are configured to cause the intermediate value or the final output for the article of manufacture to be in-specification; and
after the generating,
updating, by the deep learning controller, process parameters of a downstream station controller associated with the downstream processing station based on the one or more control inputs, and
causing direct transfer of the article of manufacture from the first processing station to the downstream processing station for a further step in the manufacturing process in accordance with the one or more control inputs.

2. The computer-implemented method of claim 1, further comprising:
updating the one or more control inputs of the downstream station controller, if a confidence level associated with the one or more control inputs exceeds a predetermined threshold.

3. The computer-implemented method of claim 2, wherein updating the one or more control inputs of the downstream station controller, further comprises:
providing a first control input to a first station controller associated with a first downstream processing station; and
providing a second control input to a second station controller associated with a second downstream processing station, and wherein the second downstream processing station is downstream from the first downstream processing station in the manufacturing process.

4. The computer-implemented method of claim 1, wherein predicting the expected value for the intermediate value at the downstream processing station or the final output of the article of manufacture, further comprises:
   identifying one or more key influencers associated with the manufacturing process; and
   adjusting the one or more control inputs associated with at least one of the one or more key influencers.

5. The computer-implemented method of claim 1, further comprising:
   receiving a second set of in-process inputs, at the deep learning controller, wherein the second set of in-process inputs are generated at the downstream processing station; and
   predicting, by the deep learning controller, a second expected value for a second intermediate value at a second downstream station or an updated final output of the article of manufacture, based on the first set of in-process inputs and the second set of in-process inputs.

6. The computer-implemented method of claim 5, further comprising:
   upon determining that the second expected value for the article of manufacture is not in-specification, generating, by the deep learning controller, a second set of control inputs, wherein the second set of control inputs are configured to cause the second intermediate value or the updated final output for the article of manufacture to be in-specification.

7. The computer-implemented method of claim 1, wherein the first set of in-process inputs comprises one or more of: speed, temperature, pressure, vacuum, rotation, current, voltage, resistance, or power.

8. A system comprising:
   one or more processors; and
   a non-transitory memory storing instructions that, when executed by the one or more processors, cause the one or more processors to perform operations comprising:
      receiving a first set of in-process inputs from a first processing station, at a deep learning controller, wherein the first set of in-process inputs are generated at the first processing station deployed in a manufacturing process, wherein the first set of in-process inputs are attributes of the first processing station of a plurality of stations in the manufacturing process;
      predicting, by the deep learning controller, an expected value for an intermediate value at a downstream processing station or a final output of an article of manufacture, based on the first set of in-process inputs;
      determining, by the deep learning controller, that the expected value for the article of manufacture is not in-specification;
      based on the determining, generating, by the deep learning controller, one or more control inputs, wherein the one or more control inputs are configured to cause the intermediate value or the final output for the article of manufacture to be in-specification; and
      after the generating,
         updating, by the deep learning controller, process parameters of a downstream station controller associated with the downstream processing station based on the one or more control inputs, and
         causing direct transfer of the article of manufacture from the first processing station to the downstream processing station for a further step in the manufacturing process in accordance with the one or more control inputs.

9. The system of claim 8, wherein the operations further comprise:
   updating the one or more control inputs of the downstream station controller, if a confidence level associated with the one or more control inputs exceeds a predetermined threshold.

10. The system of claim 9, wherein updating the one or more control inputs of the downstream station controller, further comprises:
    providing a first control input to a first station controller associated with a first downstream processing station; and
    providing a second control input to a second station controller associated with a second downstream processing station, and wherein the second downstream processing station is downstream from the first downstream processing station in the manufacturing process.

11. The system of claim 8, wherein predicting the expected value for the intermediate value at the downstream processing station or the final output of the article of manufacture, further comprises:
    identifying one or more key influencers associated with the manufacturing process; and
    adjusting the one or more control inputs associated with at least one of the one or more key influencers.

12. The system of claim 8, wherein the operations further comprise:
    receiving a second set of in-process inputs, at the deep learning controller, wherein the second set of in-process inputs are generated at the downstream processing station; and
    predicting, by the deep learning controller, a second expected value for a second intermediate value at a second downstream station or an updated final output of the article of manufacture, based on the first set of in-process inputs and the second set of in-process inputs.

13. The system of claim 12, wherein the operations further comprise:
    upon determining that the second expected value for the article of manufacture is not in-specification, generating, by the deep learning controller, a second set of control inputs, wherein the second set of control inputs are configured to cause the second intermediate value or the updated final output for the article of manufacture to be in-specification.

14. The system of claim 8, wherein the first set of in-process inputs comprises one or more of: speed, temperature, pressure, vacuum, rotation, current, voltage, resistance, or power.

15. A non-transitory computer-readable storage medium comprising instructions stored therein, which when executed by one or more processors, cause the one or more processors to perform operations comprising:
    receiving a first set of in-process inputs from a first processing station, at a deep learning controller, wherein the first set of in-process inputs are generated at the first processing station deployed in a manufacturing process, wherein the first set of in-process inputs are attributes of the first processing station of a plurality of stations in the manufacturing process;
    predicting, by the deep learning controller, an expected value for an intermediate value at a downstream processing station or a final output of an article of manufacture, based on the first set of in-process inputs;

determining, by the deep learning controller, that the expected value for the article of manufacture is not in-specification;

based on the determining, generating, by the deep learning controller, one or more control inputs, wherein the one or more control inputs are configured to cause the intermediate value or the final output for the article of manufacture to be in-specification; and after the generating, updating, by the deep learning controller, process parameters of a downstream station controller associated with the downstream processing station based on the one or more control inputs, and causing direct transfer of the article of manufacture from the first processing station to the downstream processing station for a further step in the manufacturing process in accordance with the one or more control inputs.

16. The non-transitory computer-readable storage medium of claim 15, further comprising:

updating the one or more control inputs of the downstream station controller, if a confidence level associated with the one or more control inputs exceeds a predetermined threshold.

17. The non-transitory computer-readable storage medium of claim 16, wherein updating the one or more control inputs of the downstream station controller, further comprises:

providing a first control input to a first station controller associated with a first downstream processing station; and providing a second control input to a second station controller associated with a second downstream processing station, and wherein the second downstream processing station is downstream from the first downstream processing station in the manufacturing process.

18. The non-transitory computer-readable storage medium of claim 15, wherein predicting the expected value for the intermediate value at the downstream processing station or the final output of the article of manufacture, further comprises:

identifying one or more key influencers associated with the manufacturing process; and adjusting the one or more control inputs associated with at least one of the one or more key influencers.

19. The non-transitory computer-readable storage medium of claim 15, further comprising:

receiving a second set of in-process inputs, at the deep learning controller, wherein the second set of in-process inputs are generated at the downstream processing station; and predicting, by the deep learning controller, a second expected value for a second intermediate value at a second downstream station or an updated final output of the article of manufacture, based on the first set of in-process inputs and the second set of in-process inputs.

20. The non-transitory computer-readable storage medium of claim 19, further comprising:

upon determining that the second expected value for the article of manufacture is not in-specification, generating, by the deep learning controller, a second set of control inputs, wherein the second set of control inputs are configured to cause the second intermediate value or the updated final output for the article of manufacture to be in-specification.

* * * * *